United States Patent
Wang et al.

(10) Patent No.: US 9,958,551 B1
(45) Date of Patent: May 1, 2018

(54) METHOD AND DEVICE FOR DETERMINING AVAILABILITY OF ARAIM SYSTEM

(71) Applicant: Beihang University, Beijing (CN)

(72) Inventors: Zhipeng Wang, Beijing (CN); Yanbo Zhu, Beijing (CN); Wei Shao, Beijing (CN); Qiang Li, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days. days.

(21) Appl. No.: 15/723,543

(22) Filed: Oct. 3, 2017

(30) Foreign Application Priority Data

Jul. 7, 2017 (CN) .......................... 2017 1 0551976

(51) Int. Cl.
*G01S 19/42* (2010.01)
*G01S 19/25* (2010.01)
*G01S 19/05* (2010.01)
*G01S 19/41* (2010.01)
G01S 19/00 (2010.01)

(52) U.S. Cl.
CPC .............. *G01S 19/42* (2013.01); *G01S 19/05* (2013.01); *G01S 19/256* (2013.01); *G01S 19/41* (2013.01)

(58) Field of Classification Search
CPC ........ G01S 19/42; G01S 19/41; G01S 19/256; G01S 19/05; G01S 19/40; G01S 19/28; G06F 17/14
See application file for complete search history.

(56) References Cited

U.S. PATENT DOCUMENTS

| 6,782,124 | B2 * | 8/2004 | Gloersen | G06F 17/14 |
| 2003/0231132 | A1 * | 12/2003 | Park et al. | G01S 19/28 |
| 2013/0057429 | A1 * | 3/2013 | Liou et al. | G01S 19/40 |
| 2016/0274242 | A1 * | 9/2016 | Skalicky et al. | G01S 19/28 |

* cited by examiner

*Primary Examiner* — Bernarr E Gregory
(74) *Attorney, Agent, or Firm* — Locke Lord LLP; Tim Tingkang Xia, Esq.

(57) ABSTRACT

A method for evaluating the availability of ARAIM system is provided. A satellite position coordinate and clock offset of each satellite at a current time point and several time points before the current time point are received. Empirical mode decomposition is performed on the position coordinate and the clock offset respectively, to obtain a position coordinate mode component and a clock offset mode component of each satellite at each time point. A position coordinate mode component and a clock offset mode component of each satellite at a time point next to the current time point are obtained respectively. According to the position coordinate mode component and the clock offset mode component of each satellite at the time point next to the current time point, a position coordinate mode component and a clock offset mode component of each satellite at a next time point is obtained, thereby obtaining an evaluation result.

8 Claims, 4 Drawing Sheets

METHOD AND DEVICE FOR DETERMINING AVAILABILITY OF ARAIM SYSTEM

CROSS-REFERENCE TO RELATED PATENT APPLICATION

This application claims priority to and the benefit of, pursuant to 35 U.S.C. § 119(a), patent application Serial No. CN201710551976.1 filed in China on Jul. 7, 2017. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to satellite navigation technologies, and particularly to a method and device for evaluating the availability of a satellite navigation system.

BACKGROUND

Advanced receiver autonomous integrity monitoring (ARAIM) is developed on the basis of receiver autonomous integrity monitoring (RAIM). The availability of a satellite navigation system used by an aerial craft in a flight phase can be evaluated by ARAIM according to satellite measurement data received by a receiver and ground integrity support information (ISM). When an evaluation result shows that ARAIM fails to meet the integrity requirement for navigation performance needed in a flight phase of an aerial craft, the aerial craft has to use a roadbed navigation apparatus in the flight phase, rather than the satellite navigation system.

An existing method based on ARAIM for evaluating the availability of a satellite navigation system comprises the following steps: calculating a horizontal protection level (HPL), a vertical protection level (VPL), and an effective monitor threshold (EMT) espectivley according to satellite measurement data received by a receiver and preset ISM, comparing the obtained HPL, VPL, and EMT respectively with a preset HPL threshold, a preset VPL threshold, and a preset EMT threshold, and determining an evaluation result according to a comparison result.

However, by means of the existing ARAIM, only the availability of a satellite navigation system at a current time point can be evaluated according to satellite measurement data received at the current time point, and the availability of the satellite navigation system at a time point next to the current time point cannot be evaluated, which is not conducive to the availability evaluation of the satellite navigation system at the time when an aerial craft is on a long-distance flight.

SUMMARY

In view of the technical problem that the availability of a satellite navigation system at a time point next to a current time point cannot be evaluated by the existing ARAIM, the present invention provides a method and device for evaluating the availability of a satellite navigation system.

In an aspect, the method for evaluating the availability of a satellite navigation system provided in the present invention comprises:

receiving measurement data of each satellite at each time point, the measurement data including a position coordinate and a clock offset of the satellite, and the each time point including a current time point and several time points before the current time point;

performing empirical mode decomposition on the position coordinate and the clock offset respectively, to obtain a position coordinate mode component and a clock offset mode component of each satellite at each time point;

obtaining a position coordinate mode component and a clock offset mode component of each satellite at a time point next to the current time point respectively, according to a preset autoregressive moving average model, a preset random noise sequence parameter, and the position coordinate mode component and the clock offset mode component of each satellite at each time point;

calculating a HPL, a VPL and an EMT respectively, according to the position coordinate mode component and the clock offset mode component of each satellite at the time point next to the current time point and preset ground integrity support information; and comparing the HPL, the VPL and the EMT respectively with a preset HPL threshold, a preset VPL threshold, and a preset EMT threshold, to obtain an evaluation result.

Further, the performing empirical mode decomposition on the position coordinate and the clock offset respectively to obtain a position coordinate mode component and a clock offset mode component of each satellite at each time point comprises:

selecting any one of the position coordinates or any one of the clock offsets as a parameter to be decomposed, and calculating a mean value of an upper and lower envelope of the parameter to be decomposed;

calculating a difference between the parameter to be decomposed and the mean value of the upper and lower envelope of the parameter to be decomposed, to obtain a first differential component;

calculating a mean value of an upper and lower envelope of the first differential component;

calculating a difference between the first differential component and the mean value of the upper and lower envelope of the first differential component, to obtain a second differential component;

determining whether the second differential component is an intrinsic mode function according to a standard deviation of the first differential component and the second differential component;

if not, taking the second differential component as a parameter to be decomposed, and proceeding back to the step of calculating a mean value of an upper and lower envelope of the parameter to be decomposed; and if yes, recording the second differential component as an intrinsic mode component on a mode component list corresponding to the parameter to be decomposed; calculating a difference between the parameter to be decomposed and the second differential component, to obtain a redundant component; if the redundant component is a monotonic function or an amplitude of the redundant component is less than a preset amplitude threshold, taking a sum of each of the intrinsic mode components on the mode component list and the redundant component as a mode component corresponding to any one of the position coordinates or any one of the clock offsets, and selecting a next position coordinate or a next clock offset as a parameter to be decomposed, until the mode components corresponding to all the position coordinates and the mode components corresponding to all the clock offsets are obtained; or otherwise, taking the redundant component as a parameter to be decomposed, and proceeding back to the step of calculating a mean value of an upper and lower envelope of the parameter to be decomposed.

Further, the determining whether the second differential component is an intrinsic mode function according to a standard deviation of the first differential component and the second differential component comprises:

calculating a difference between the second differential component and the first differential component, to obtain a difference value;

calculating a ratio of a squared absolute value of the difference value to a squared value of the second differential component; and if the ratio of the squared values does not fall outside a preset ratio interval, the second differential component being determined as an intrinsic mode function; or otherwise, the second differential component being determined as a non-intrinsic mode function.

Further, the obtaining a position coordinate mode component and a clock offset mode component of each satellite at a time point next to the current time point respectively, according to a preset autoregressive moving average model, a preset random noise sequence parameter, and the position coordinate mode component and the clock offset mode component of each satellite at each time point comprises:

selecting any one of the satellites as a target satellite;

calculating a product of each position coordinate mode component of the target satellite at each time point with preset time series respectively, summing the products and obtaining a sum of first products; and taking a sum of the sum of the first products and the random noise sequence parameter as the position coordinate mode component of the target satellite at the time point next to the current time point;

calculating a product of each clock offset mode component of the target satellite at each time point with the preset time series respectively, summing the products and obtaining a sum of second products; and taking a sum of the sum of the second products and the random noise sequence parameter as the clock offset mode component of the target satellite at the time point next to the current time point; and selecting a next satellite as a target satellite, until the position coordinate mode components and the clock offset mode components of all the satellites at the time point next to the current time point are obtained.

In another aspect, the device for evaluating the availability of a satellite navigation system provided in the present invention comprises:

a receiving module, configured to receive measurement data of each satellite at each time point, the measurement data including a position coordinate and a clock offset of the satellite, and the each time point including a current time point and several time points before the current time point;

a decomposition module, configured to perform empirical mode decomposition on the position coordinate and the clock offset respectively, to obtain a position coordinate mode component and a clock offset mode component of each satellite at each time point;

a predetermination module, configured to obtain a position coordinate mode component and a clock offset mode component of each satellite at a time point next to the current time point respectively, according to a preset autoregressive moving average model, a preset random noise sequence parameter, and the position coordinate mode component and the clock offset mode component of each satellite at each time point;

a protection level acquisition module, configured to calculate a (HPL), a VPL and an EMT respectively, according to the position coordinate mode component and the clock offset mode component of each satellite at the time point next to the current time point and preset ground integrity support information; and a comparison module, configured to compare the HPL, the VPL and the EMT respectively with a preset HPL threshold, a preset VPL threshold, and a preset EMT threshold, to obtain an evaluation result.

Further, the decomposition module is specifically configured to:

select any one of the position coordinates or any one of the clock offsets as a parameter to be decomposed, and calculate a mean value of an upper and lower envelope of the parameter to be decomposed;

calculate a difference between the parameter to be decomposed and the mean value of the upper and lower envelope of the parameter to be decomposed, to obtain a first differential component;

calculate a mean value of an upper and lower envelope of the first differential component;

calculate a difference between the first differential component and the mean value of the upper and lower envelope of the first differential component, to obtain a second differential component;

determine whether the second differential component is an intrinsic mode function according to a standard deviation of the first differential component and the second differential component;

if not, take the second differential component as a parameter to be decomposed, and proceed back to the step of calculate a mean value of an upper and lower envelope of the parameter to be decomposed; and if yes, record the second differential component as an intrinsic mode component on a mode component list corresponding to the parameter to be decomposed; calculate a difference between the parameter to be decomposed and the second differential component, to obtain a redundant component; if the redundant component is a monotonic function or an amplitude of the redundant component is less than a preset amplitude threshold, take a sum of each of the intrinsic mode components on the mode component list and the redundant component as a mode component corresponding to any one of the position coordinates or any one of the clock offsets, and select a next position coordinate or a next clock offset as a parameter to be decomposed, until the mode components corresponding to all the position coordinates and the mode components corresponding to all the clock offsets are obtained; or otherwise, take the redundant component as a parameter to be decomposed, and proceed back to the step of calculating a mean value of an upper and lower envelope of the parameter to be decomposed.

Further, the decomposition module is specifically configured to:

calculate a difference between the second differential component and the first differential component, to obtain a difference value;

calculate a ratio of a squared absolute value of the difference value to a squared value of the second differential component; and if the ratio of the squared values does not fall outside a preset ratio interval, determine the second differential component as an intrinsic mode function; or otherwise, determine the second differential component as a non-intrinsic mode function.

Further, the predetermination module is specifically configured to:

select any one of the satellites as a target satellite;

calculate a product of each position coordinate mode component of the target satellite at each time point with preset time series respectively, sum the products and obtain a sum of first products; and take a sum of the sum of the first products and the random noise sequence parameter as the position coordinate mode component of the target satellite at the time point next to the current time point;

calculate a product of each clock offset mode component of the target satellite at each time point with the preset time series respectively, sum the products and obtain a sum of second products; and take a sum of the sum of the second products and the random noise sequence parameter as the clock offset mode component of the target satellite at the time point next to the current time point; and select a next satellite as a target satellite, until the position coordinate mode components and the clock offset mode components of all the satellites at the time point next to the current time point are obtained.

According to the method and device for evaluating the availability of a satellite navigation system provided in the present invention, a satellite position coordinate and clock offset of each satellite at a current time point and several time points before the current time point are received; empirical mode decomposition is performed on the position coordinate and the clock offset respectively, to obtain a position coordinate mode component and a clock offset mode component of each satellite at each time point; a position coordinate mode component and a clock offset mode component of each satellite at a time point next to the current time point are obtained respectively, according to a preset autoregressive moving average model, a preset random noise sequence parameter, and the position coordinate mode component and the clock offset mode component of each satellite at each time point; an HPL, a VPL and an EMT are calculated respectively, according to the position coordinate mode component and the clock offset mode component of each satellite at the time point next to the current time point and preset ground integrity support information; and the HPL, the VPL and the EMT are compared respectively with a preset HPL threshold, a preset VPL threshold, and a preset EMT threshold, to obtain an evaluation result. In this manner, an evaluation result of the availability of a satellite navigation system at a time point next to the current time point can be obtained according to a predicted position coordinate mode component and clock offset mode component of each satellite at the time point next to the current time point.

BRIEF DESCRIPTION OF THE DRAWINGS

Further objectives, effects, and advantages of the present invention will become apparent from the following description of the embodiments of the present invention with reference to the accompanying drawings, wherein.

DETAILED DESCRIPTION

The objects, technical solutions and advantages of the embodiments of the present invention will become more apparent from the following clear and thorough description of the technical solutions provided in the embodiments of the present invention taken in conjunction with the accompanying drawings in the embodiments of the present invention.

Figure 1:
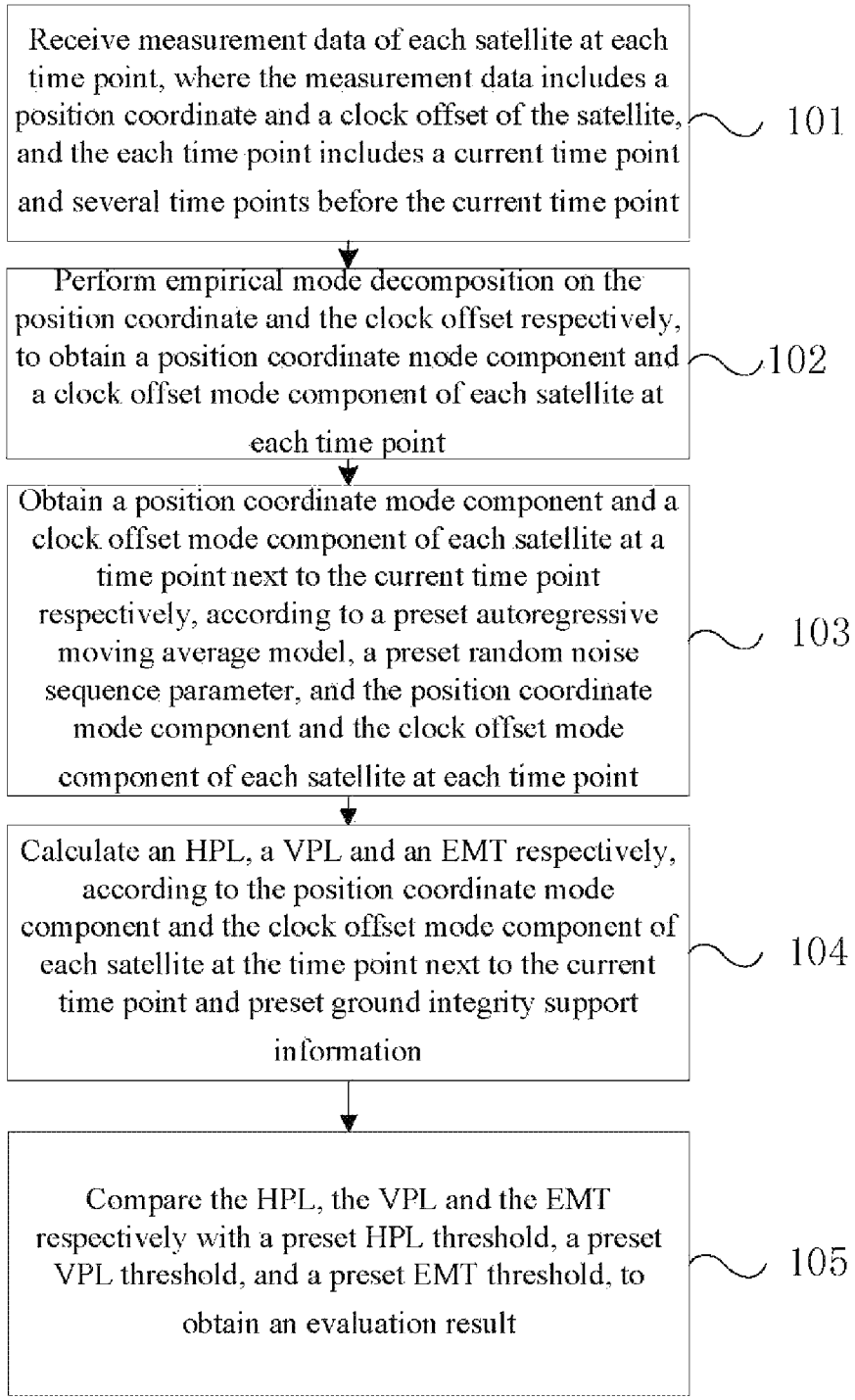
FIG. 1 is a flow chart of a method for evaluating the availability of a satellite navigation system provided in a first embodiment of the present invention.

To solve the technical problem existing in the prior art that ARAIM cannot evaluate the availability of a satellite navigation system at a time point next to the current time point, FIG. 1 is a schematic flow chart of a method for evaluating the availability of a satellite navigation system provided in a first embodiment of the present invention.

As shown in FIG. 1, the method for evaluating the availability of a satellite navigation system provided in the first embodiment of the present invention comprises the following steps.

Step 101: Receive measurement data of each satellite at each time point, where the measurement data includes a position coordinate and a clock offset of the satellite, and the each time point includes a current time point and several time points before the current time point.

It is to be noted that the first embodiment of the present invention may be a device for evaluating the availability of a satellite navigation system, which may be specifically an entity structure consisting of a physical device such as a processor, a memory, a logic circuit group, a chipset, or the like.

Specifically, in the first embodiment of the present invention, historical ephemeris data of each satellite is obtained firstly. Particularly, measurement data of each satellite at a current time point and several time points before the current time point is received, where the measurement data includes specifically a position coordinate and a clock offset of the satellite. Such data may be derived specifically from a database such as the ephemeris database on the website of Air Traffic Management Bureau, Civil Aviation Administration of China, and the time interval may be consistent with the measurement period of the measurement data, which are not limited herein.

Step 102: Perform empirical mode decomposition on the position coordinate and the clock offset respectively, to obtain a position coordinate mode component and a clock offset mode component of each satellite at each time point.

Specifically, because the data of each position coordinate and each clock offset obtained of each satellite at each time point is a nonlinear and unstable data signal, each position coordinate and each clock offset are processed by empirical mode decomposition, to obtain a local characteristic signal of each position coordinate and each clock offset, that is, each position coordinate mode component and each clock offset mode component.

Step 103: Obtain a position coordinate mode component and a clock offset mode component of each satellite at a time point next to the current time point respectively, according to a preset autoregressive moving average model, a preset random noise sequence parameter, and the position coordinate mode component and the clock offset mode component of each satellite at each time point.

Specifically, to obtain position coordinate information and clock offset information of each satellite at a time point next to the current time point, each position coordinate mode component and each clock offset mode component of each satellite at each time point are respectively processed by using a preset autoregressive moving average model, and a result of processing is corrected by using a preset random noise sequence parameter, to obtain a position coordinate mode component and a clock offset mode component of each satellite at the time point next to the current time point.

Step 104: Calculate an HPL, a VPL and an EMT respectively, according to the position coordinate mode component and the clock offset mode component of each satellite at the time point next to the current time point and preset ground integrity support information.

Step 105: Compare the HPL, the VPL and the EMT respectively with a preset HPL threshold, a preset VPL threshold, and a preset EMT threshold, to obtain an evaluation result.

Specifically, in Steps 104 and 105, according to preset ground integrity support information, and the position coordinate mode component and the clock offset component of each satellite at the time point next to the current time point obtained through prediction according to the measurement data of each satellite at the current time point and several time points before the current time point, an HPL, a VPL, and an EMT are calculated, and a corresponding evaluation result is obtained according to the calculation results and respective thresholds. The HPL, VPL and EMT may be calculated through any of the prior-art calculation methods, and the acquisition of the evaluation result and the setting of the thresholds may be decided by those skilled in the art according to practical situations, which are not limited herein.

Moreover, it should be noted that the method for evaluating the availability of a satellite navigation system provided in the present invention is applicable to the availability evaluation of a satellite navigation system before a scheduled flight is navigated. For example, if the evaluation time is at 9:00 am on Jun. 15, 2017, the measurement data of each satellite that is capable of being received and acquired at this time is specifically all the measurement data over a period of time from 9:00 am on Jun. 15, 2016 to 9:00 am on Jun. 15, 2017, where the time interval is assumed to be 2 hours. The departure time of the scheduled flight is at 10:00 am on Jun. 15, 2017, and the landing time is at 1:00 pm on Jun. 15, 2017. In order to evaluate the availability of satellite navigation for the scheduled flight in the flight phase, measurement data at a next time point is predicted by using the measurement data obtained over the period of time from 9:00 am on Jun. 15, 2016 to 9:00 am on Jun. 15, 2017. That is, a position coordinate mode component and a clock offset mode component of each satellite at 10:00 am on Jun. 15, 2017 are calculated, and an evaluation result at 10:00 am on Jun. 15, 2017 is obtained. Then, the measurement data of each satellite at 10:00 am on Jun. 15, 2017 is taken as known data, a position coordinate mode component and a clock offset mode component of each satellite at 11:00 am on Jun. 15, 2017 are calculated by using the measurement data over the period of time from 9:00 am on Jun. 15, 2016 to 10:00 am on Jun. 15, 2017, and an evaluation result at 11:00 am on Jun. 15, 2017 is obtained. The rest can be obtained by analogy, until the evaluation results at all the desired time points are obtained. Therefore, the evaluation method provided in the present invention is widely applicable to the evaluation and prediction of the availability of a satellite navigation system in a flight phase of an aerial craft.

Meanwhile, after the practical use of the evaluation method provided in the present invention, a process of calibrating the preset autoregressive moving average model is further included. That is, a predicted evaluation result obtained in the present invention can be calibrated by using an actual evaluation result, for use in a next prediction, such that a next predicted evaluation result is more accurate, where the calibration method is not limited in the present invention.

According to the method for evaluating the availability of a satellite navigation system provided in the first embodiment of the present invention, a satellite position coordinate and clock offset of each satellite at a current time point and several time points before the current time point are received; empirical mode decomposition is performed on the position coordinate and the clock offset respectively, to obtain a position coordinate mode component and a clock offset mode component of each satellite at each time point; a position coordinate mode component and a clock offset mode component of each satellite at a time point next to the current time point are obtained respectively, according to a preset autoregressive moving average model, a preset random noise sequence parameter, and the position coordinate mode component and the clock offset mode component of each satellite at each time point; an HPL, a VPL and an EMT are calculated respectively, according to the position coordinate mode component and the clock offset mode component of each satellite at the time point next to the current time point and preset ground integrity support information; and the HPL, the VPL and the EMT are compared respectively with a preset HPL threshold, a preset VPL threshold, and a preset EMT threshold, to obtain an evaluation result. In this manner, an evaluation result of the availability of a satellite navigation system at a time point next to the current time point can be obtained according to a predicted position coordinate mode component and clock offset mode component of each satellite at the time point next to the current time point.

Figure 2:
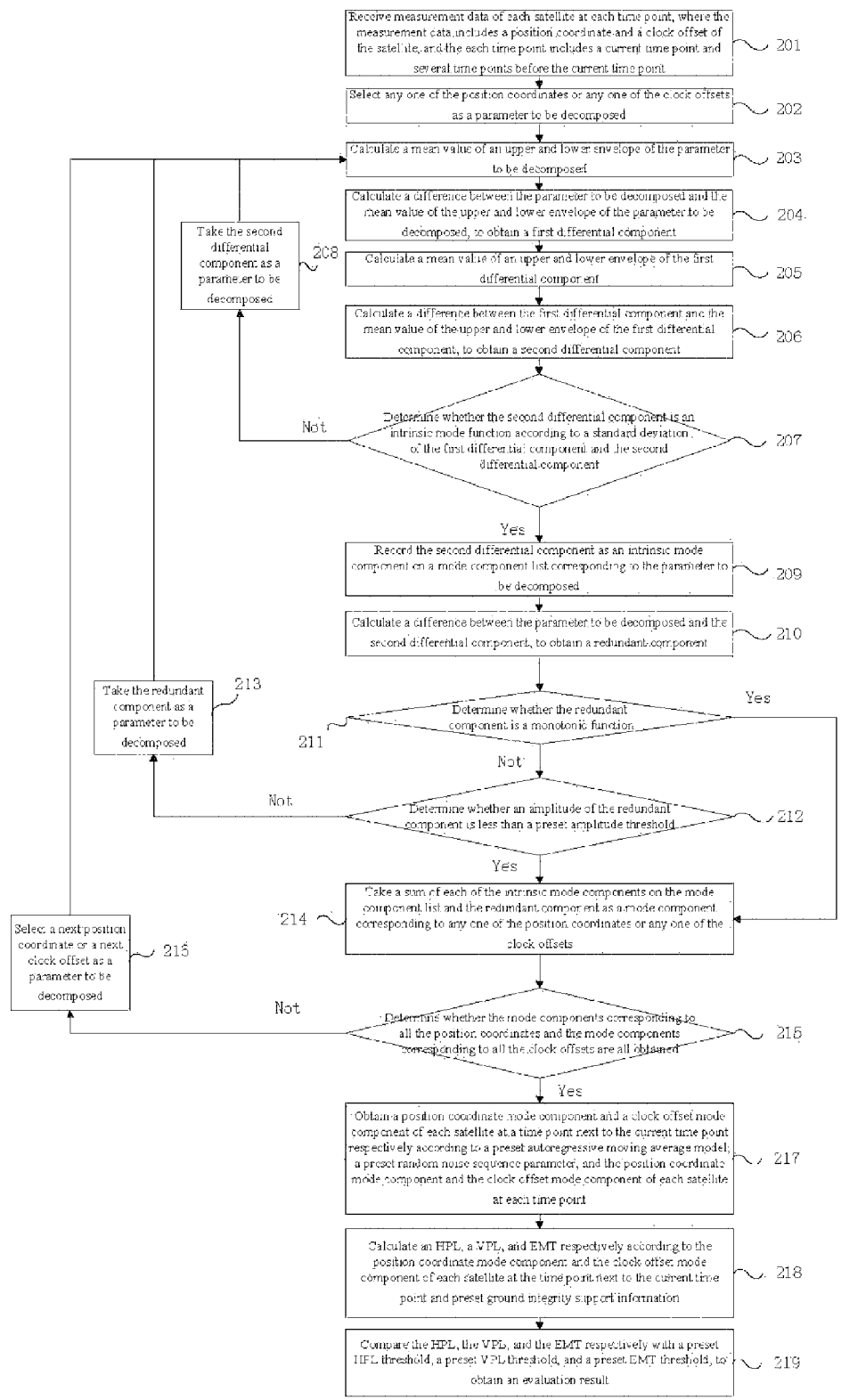
FIG. 2 is a flow chart of a method for evaluating the availability of a satellite navigation system provided in a second embodiment of the present invention.
Figure 3:
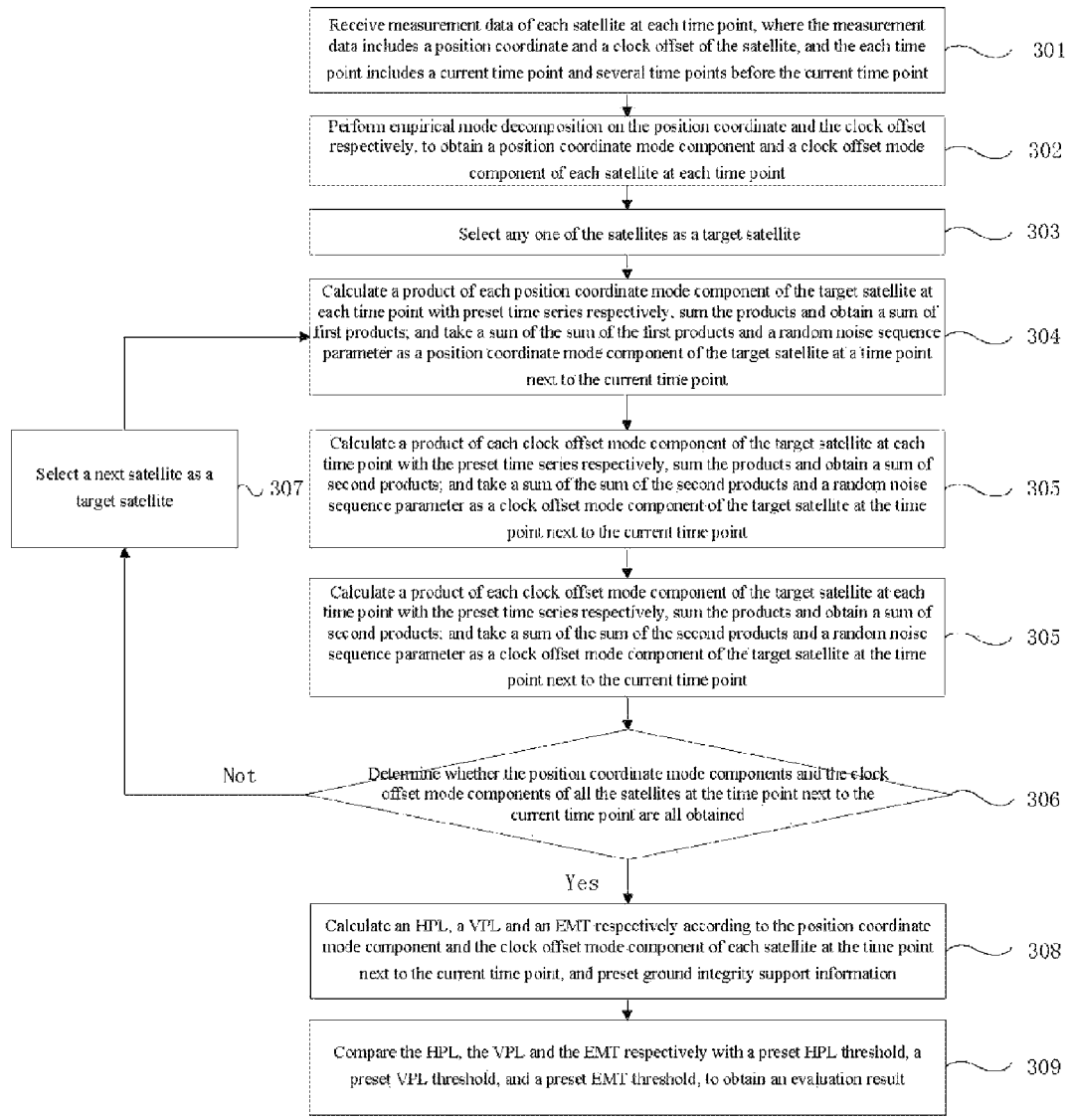
FIG. 3 is a flow chart of another method for evaluating the availability of a satellite navigation system provided in the second embodiment of the present invention.

On the basis of the method for evaluating the availability of a satellite navigation system shown in FIG. 1, to further improve the accuracy of the evaluation result obtained through the method, FIG. 2 is a flow chart of a method for evaluating the availability of a satellite navigation system provided in a second embodiment of the present invention and FIG. 3 is a flow chart of another method for evaluating the availability of a satellite navigation system provided in the second embodiment of the present invention.

As shown in FIG. 2, the method for evaluating the availability of a satellite navigation system provided in the second embodiment of the present invention comprises the following steps.

Step 201: Receive measurement data of each satellite at each time point, where the measurement data includes a position coordinate and a clock offset of the satellite, and the each time point includes a current time point and several time points before the current time point.

In the second embodiment, the position coordinate of the satellite can be specifically expressed in Cartesian coordinates, for example, (X, Y, Z), and the clock offset can be expressed as T.

Step 202: Select any one of the position coordinates or any one of the clock offsets as a parameter to be decomposed.

Step 203: Calculate a mean value of an upper and lower envelope of the parameter to be decomposed.

Step 204: Calculate a difference between the parameter to be decomposed and the mean value of the upper and lower envelope of the parameter to be decomposed, to obtain a first differential component.

Step 205: Calculate a mean value of an upper and lower envelope of the first differential component.

Step 206: Calculate a difference between the first differential component and the mean value of the upper and lower envelope of the first differential component, to obtain a second differential component.

Step 207: Determine whether the second differential component is an intrinsic mode function according to a standard deviation of the first differential component and the second differential component.

If the second differential component is an intrinsic mode function, Step 209 is performed; and if the second differential component is not an intrinsic mode function, Step 208 is performed.

Step 208: Take the second differential component as a parameter to be decomposed, and proceed back to Step 203.

Step 209: Record the second differential component as an intrinsic mode component on a mode component list corresponding to the parameter to be decomposed.

Step 210: Calculate a difference between the parameter to be decomposed and the second differential component, to obtain a redundant component.

Step 211: Determine whether the redundant component is a monotonic function.

If the redundant component is not a monotonic function, Step 212 is performed; and if the redundant component is a monotonic function, Step 214 is performed.

Step 212: Determine whether an amplitude of the redundant component is less than a preset amplitude threshold.

If the amplitude of the redundant component is not less than a preset amplitude threshold, Step 213 is performed; and if the amplitude of the redundant component is less than a preset amplitude threshold, Step 214 is performed.

Step 213: Take the redundant component as a parameter to be decomposed, and proceed back to Step 203.

Step 214: Take a sum of each of the intrinsic mode components on the mode component list and the redundant component as a mode component corresponding to any one of the position coordinates or any one of the clock offsets.

Step 215: Determine whether the mode components corresponding to all the position coordinates and the mode components corresponding to all the clock offsets are all obtained.

If the mode components corresponding to all the position coordinates and the mode components corresponding to all the clock offsets are not all obtained, Step 216 is obtained; and if the mode components corresponding to all the position coordinates and the mode components corresponding to all the clock offsets are all obtained, Step 217 is performed.

Step 216: Select a next position coordinate or a next clock offset as a parameter to be decomposed, and proceed back to Step 203.

To further describe the technical solution provided in the present invention, empirical mode decomposition being performed on the position coordinate and the clock offset respectively to obtain a position coordinate mode component and a clock offset mode component of each satellite at each time point, may be specifically implemented through the technical solution of Steps 202 to 216.

Specifically, any one of the position coordinates or any one of the clock offsets is selected as a parameter to be decomposed. For example, the selected parameter to be decomposed is $T_{(m,n)}$, in which m represents an m-th satellite, and n represents an n-th time point, where m and n are both positive integers. That is to say, the selected parameter to be decomposed is the clock offset of the m-th satellite at the n-th time point. Then, a mean value $T_{((m,n),ave)}$ of an upper and lower envelope of $T_{(m,n)}$ is calculated and obtained, and a first differential component $T_{((m,n),dif1)}$ is obtained, where the first differential component is obtained by $T_{((m,n),(dif1)} = T_{(m,n)} - T_{((m,n),ave)}$. A mean value $T_{(((m,n),dif1),ave)}$ of an upper and lower envelope of the first differential component is calculated, and a second differential component $T_{((m,n),dif2)}$ is obtained, where the second differential component is obtained by $T_{((m,n),dif2)} = T_{(((m,n)dif1),ave)}$.

Whether the second differential component is an intrinsic mode function is determined by, for example, calculating a difference between the second differential component and the first differential component, to obtain a difference value; calculating a ratio of a squared absolute value of the difference value to a squared value of the second differential component; and if the ratio of the squared values does not fall outside a preset ratio interval, determining the second differential component as an intrinsic mode function; or otherwise, determining the second differential component as a non-intrinsic mode function.

Specifically, whether the second differential component is an intrinsic mode function may be determined through Formula (1):

$$0.2 \leq \frac{|T_{((m,n),dif1)} - T_{((m,n),dif2)}|^2}{T_{((m,n),dif2)}^2} \leq 0.3 \qquad \text{Formula (1)}$$

where $T_{((m,n),dif1)}$ is the first differential component, and $T_{((m,n),dif2)}$ is the second differential component.

In this case, if the second differential component $T_{((m,n),dif2)}$ does not satisfy Formula (1), it is suggested that the second differential component is not an intrinsic mode function. Then, the obtained $T_{((m,n),dif2)}$ is taken as a parameter to be decomposed, and iterative steps of calculating a mean value of an upper and lower envelope of the parameter to be decomposed and others are repeated, until the obtained second differential component is an intrinsic mode function.

If the second differential component $T_{((m,n),dif2)}$ satisfies Formula (1), it is suggested that the second differential component is an intrinsic mode function. Then the expression formula of the second differential component at this time is recorded as a $1^{st}$ intrinsic mode component $T_{((m,n),IMF,1)}$ of the m-th satellite at the n-th time point on a corresponding mode component list. Subsequently, a redundant component $T_{((m,n),ref)}$ is obtained through calculation, where the redundant component is obtained by $T_{(m,n),ref)} = T_{(m,n)} - T_{((m,n),dif2)}$. When the redundant component is not a monotonic function or an amplitude of the redundant component is not less than a preset amplitude threshold, the redundant component is taken as a parameter to be decomposed, and iterative steps of calculating a mean value of an upper and lower envelope of the parameter to be decomposed and others are repeated, until the obtained redundant component $T_{((m,n),ref)}$ is a monotonic function or an amplitude of the obtained redundant component $T_{((m,n),ref)}$ is less than the preset amplitude threshold. At this time, a clock offset mode component $T'_{(m,n)} = T_{((m,n),IMF,1)} + T_{((m,n),ref)}$ of the m-th satellite at the n-th time point can be obtained, where l is a positive integer representing a total number of intrinsic mode components of a clock offset $T_{(m,n)}$ in a mode component list of the m-th satellite at the n-th time point in a mode component list.

The above steps are repeated until the mode components corresponding to all the position coordinates and the mode components corresponding to all the clock offsets are obtained.

Step 217: Obtain a position coordinate mode component and a clock offset mode component of each satellite at a time point next to the current time point respectively according to a preset autoregressive moving average model, a preset random noise sequence parameter, and the position coordinate mode component and the clock offset mode component of each satellite at each time point.

Step 218: Calculate an HPL, a VPL, and EMT respectively according to the position coordinate mode component and the clock offset mode component of each satellite at the time point next to the current time point and preset ground integrity support information.

Step 219: Compare the HPL, the VPL, and the EMT respectively with a preset HPL threshold, a preset VPL threshold, and a preset EMT threshold, to obtain an evaluation result.

In the embodiment shown in FIG. 2, empirical mode decomposition is performed respectively on a position coordinate and a clock offset of each satellite at each time point, to obtain mode components corresponding to all the position coordinates and mode components corresponding to all the clock offsets of each satellite at each time point, thus laying a foundation for the subsequent calculation of a position coordinate mode component and a clock offset mode component of each satellite at a time point next to the current time point.

On the basis of the embodiment shown in FIG. 2, to further elucidate the method for evaluating the availability of a satellite navigation system provided in the second embodiment of the present invention, as shown in FIG. 3, the method comprises the following steps.

Step 301: Receive measurement data of each satellite at each time point, where the measurement data includes a position coordinate and a clock offset of the satellite, and the each time point includes a current time point and several time points before the current time point.

Step 302: Perform empirical mode decomposition on the position coordinate and the clock offset respectively, to obtain a position coordinate mode component and a clock offset mode component of each satellite at each time point.

Step 303: Select any one of the satellites as a target satellite.

Step 304: Calculate a product of each position coordinate mode component of the target satellite at each time point with preset time series respectively, sum the products and obtain a sum of first products; and take a sum of the sum of the first products and a random noise sequence parameter as a position coordinate mode component of the target satellite at a time point next to the current time point.

Step 305: Calculate a product of each clock offset mode component of the target satellite at each time point with the preset time series respectively, sum the products and obtain a sum of second products; and take a sum of the sum of the second products and a random noise sequence parameter as a clock offset mode component of the target satellite at the time point next to the current time point.

Step 306: Determine whether the position coordinate mode components and the clock offset mode components of all the satellites at the time point next to the current time point are all obtained.

If the position coordinate mode components and the clock offset mode components of all the satellites at the time point next to the current time point are not all obtained, Step 307 is performed; and if the position coordinate mode components and the clock offset mode components of all the satellites at the time point next to the current time point are all obtained, Step 308 is performed.

Step 307: Select a next satellite as a target satellite, and proceed back to Step 304.

Obtaining a position coordinate mode component and a clock offset mode component of each satellite at a time point next to the current time point respectively according to a preset autoregressive moving average model, a preset random noise sequence parameter, and the position coordinate mode component and the clock offset mode component of each satellite at each time point may be specifically implemented through the technical solution of Steps 303 to 307.

Specifically, after the mode component corresponding to each position coordinate and the mode component corresponding to each clock offset of each satellite at each time point are obtained, these mode components will be used to predict a mode component of each satellite at a time point next to the current time point.

First, an m-th satellite is taken as a target satellite. At this time, a position coordinate mode component $X'_{(m,n)}$ of the m-th satellite at an n-th time point (current time point) may be expressed as:

$$X'_{(m,n)} = X_{((m,n),IMF,1)} + X_{((m,n),IMF,2)} + \ldots + X_{((m,n),IMF,i)} + X_{((m,n),ref)}$$

where i is a positive integer representing a total number of intrinsic mode components of a mode component $X_{(m,n)}$ at a position coordinate X on a mode component list of the m-th satellite at the n-th time point on a mode component list.

Then, a product of each position coordinate mode component of the target satellite at each time point with preset time series are calculated respectively, the products are summed and a sum of first products is obtained; and a sum of the sum of the first products and a random noise sequence parameter is taken as a position coordinate mode component of the target satellite at a time point next to the current time point.

That is, an expression formula of a position coordinate mode component $X'_{(m,n+1)}$ of the m-th satellite at a (n+1) time point is:

$$X'_{(m,n+1)} = \alpha_{(m,1)} X'_{(m,1)} + \alpha_{(m,2)} X'_{(m,2)} + \ldots + \alpha_{(m,n)} X'_{(m,n)} + \theta$$

where $\alpha_{(m,n)}$ is time series of the m-th satellite at the n-th time point, and $\theta$ is a random noise sequence parameter.

Similarly, an expression formula of a position coordinate mode component $Y'_{(m,n+1)}$ of the m-th satellite at the (n+1) time point is:

$$Y'_{(m,n+1)} = \alpha_{(m,1)} Y'_{(m,1)} + \alpha_{(m,2)} Y'_{(m,2)} + \ldots + \alpha_{(m,n)} Y'_{(m,n)} + \theta.$$

An expression formula of a position coordinate mode component $Z'_{(m,n+1)}$ of the m-th satellite at the (n+1) time point is:

$$Z'_{(m,n+1)} = \alpha_{(m,1)} Z'_{(m,1)} + \alpha_{(m,2)} Z'_{(m,2)} + \ldots + \alpha_{(m,n)} Z'_{(m,n)} + \theta.$$

An expression formula of a clock offset mode component $T'_{(m,n+1)}$ of the m-th satellite at the (n+1) time point is:

$$T'_{(m,n+1)} = \alpha_{(m,1)} T'_{(m,1)} + \alpha_{(m,2)} T'_{(m,2)} + \ldots + \alpha_{(m,n)} T'_{(m,n)} + \theta.$$

At this time, the position coordinate mode components and the clock offset mode component of the m-th satellite at the (n+1) time point are all obtained. A next satellite is taken as a target satellite, and the above process is repeated until the position coordinate mode components and the clock offset mode components of all the satellites at the (n+1) time point are all obtained.

Step 308: Calculate an HPL, a VPL and an EMT respectively according to the position coordinate mode component and the clock offset mode component of each satellite at the time point next to the current time point, and preset ground integrity support information.

Step 309: Compare the HPL, the VPL and the EMT respectively with a preset HPL threshold, a preset VPL threshold, and a preset EMT threshold, to obtain an evaluation result.

Specifically, in Steps 308 and 309, according to preset ground integrity support information and the position coordinate mode component and the clock offset component of each satellite at the time point next to the current time point obtained through prediction according to the measurement data of each satellite at the current time point and several time points before the current time point, an HPL, a VPL, and an EMT are calculated, and a corresponding evaluation result is obtained according to the calculation results and respective thresholds. The HPL, VPL and EMT may be calculated through any of the prior-art calculation methods. In the second embodiment of the present invention, when the HPL is less than 40 meters, the VPL is less than 35 meters and the EMT is less than or equal to 15 meters, the evaluation result is that the satellite navigation system is available; or otherwise, the satellite navigation system is unavailable.

In the method for evaluating the availability of a satellite navigation system provided in the second embodiment of the present invention, on the basis of the first embodiment, iterative operation is employed, such that the position coordinate mode component and the clock offset mode component of each satellite at the time point next to the current time point obtained through calculation are more accurate, thereby improving the accuracy of the evaluation result for the availability of a satellite navigation system at the time point next to the current time point.

Figure 4:
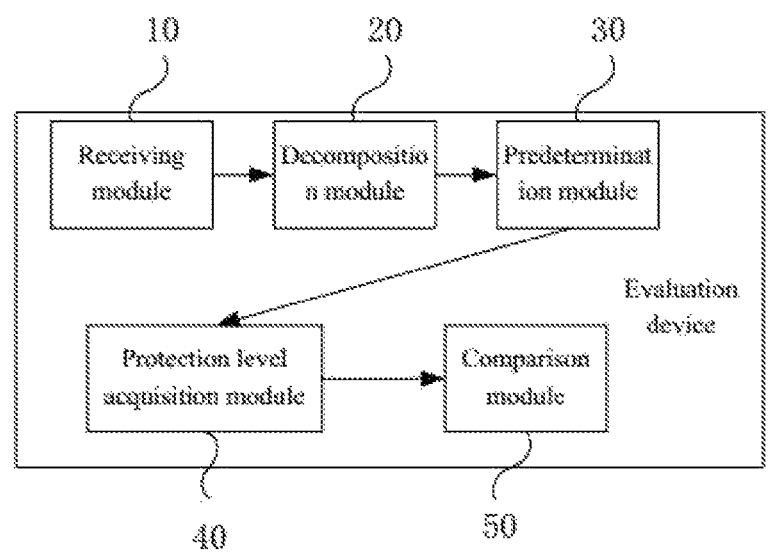
FIG. 4 is a schematic structural diagram of a device for evaluating the availability of a satellite navigation system provided in a third embodiment of the present invention.

FIG. 4 is a schematic structural diagram of a device for evaluating the availability of a satellite navigation system provided in a third embodiment of the present invention.

As shown in FIG. 4, the device for evaluating the availability of a satellite navigation system provided in the third embodiment of the present invention comprises:

a receiving module 10, configured to receive measurement data of each satellite at each time point, where the measurement data includes a position coordinate and a clock offset of the satellite, and the each time point includes a current time point and several time points before the current time point;

a decomposition module 20, configured to perform empirical mode decomposition on the position coordinate and the clock offset respectively, to obtain a position coordinate mode component and a clock offset mode component of each satellite at each time point;

a predetermination module 30, configured to obtain a position coordinate mode component and a clock offset mode component of each satellite at a time point next to the current time point respectively, according to a preset autoregressive moving average model, a preset random noise sequence parameter, and the position coordinate mode component and the clock offset mode component of each satellite at each time point;

a protection level acquisition module 40, configured to calculate an HPL, a VPL and an EMT respectively, according to the position coordinate mode component and the clock offset mode component of each satellite at the time point next to the current time point and preset ground integrity support information; and a comparison module 50, configured to compare the HPL, the VPL and the EMT respectively with a preset HPL threshold, a preset VPL threshold, and a preset EMT threshold, to obtain an evaluation result.

According to the device for evaluating the availability of a satellite navigation system provided in the third embodiment of the present invention, a satellite position coordinate and clock offset of each satellite at a current time point and several time points before the current time point are received; empirical mode decomposition is performed on the position coordinate and the clock offset respectively, to obtain a position coordinate mode component and a clock offset mode component of each satellite at each time point; a position coordinate mode component and a clock offset mode component of each satellite at a time point next to the current time point are obtained respectively, according to a preset autoregressive moving average model, a preset random noise sequence parameter, and the position coordinate mode component and the clock offset mode component of each satellite at each time point; an HPL, a VPL and an EMT are calculated respectively, according to the position coordinate mode component and the clock offset mode component of each satellite at the time point next to the current time point and preset ground integrity support information; and the HPL, the VPL and the EMT are compared respectively with a preset HPL threshold, a preset VPL threshold, and a preset EMT threshold, to obtain an evaluation result. In this manner, an evaluation result of the availability of a satellite navigation system at a time point next to the current time point can be obtained according to a predicted position coordinate mode component and clock offset mode component of each satellite at the time point next to the current time point.

It will be apparent to those skilled in the art that for the sake of convenient and simple description, the specific operation of the system described above may be made reference to a corresponding process in the foregoing method embodiment and will not be described here again.

It will be understood by those of ordinary skill in the art that all or part of the steps accomplishing the various method embodiments described above may be implemented by relevant hardware instructed by a program. The program may be stored in a computer readable storage medium. When the program is executed, the steps of the above method embodiments are performed. The storage medium comprises a ROM, a RAM, a magnetic disk, or an optical disk, and other media capable of storing a program code.

Finally, it should be noted that the above embodiments are merely illustrative of the technical solutions of the present invention and are not intended to be limiting. Although the present invention has been described in detail with reference to the foregoing embodiments, it will be understood by those of ordinary skill in the art that modifications can be made to the technical solutions described in the foregoing embodiments or equivalent replacements can be made to some or all of the technical features therein, without departing from the scope of the embodiments of the present invention.

What is claimed is:

1. A method for determining the availability of a satellite navigation system of an aerial craft in a flight phase, comprising:

receiving, by a satellite receiver, measurement data of each satellite of the aerial craft in the flight phase at each time point, the measurement data including a position coordinate and a clock offset of the satellite, and the each time point including a current time point and several time points before the current time point;

performing, executed by a processor, empirical mode decomposition on the position coordinate and the clock offset respectively, to obtain a position coordinate mode component and a clock offset mode component of each satellite at each time point;

obtaining, executed by the processor, a position coordinate mode component and a clock offset mode component of each satellite at a time point next to the current time point respectively, according to a preset autoregressive moving average model, a preset random noise sequence parameter, and the position coordinate mode component and the clock offset mode component of each satellite at each time point;

calculating, executed by the processor, a horizontal protection level (HPL), a vertical protection level (VPL) and an effective monitor threshold (EMT) respectively, according to the position coordinate mode component and the clock offset mode component of each satellite at the time point next to the current time point and preset ground integrity support information; and comparing, executed by the processor, the HPL, the VPL and the EMT respectively with a preset HPL threshold, a preset VPL threshold, and a preset EMT threshold, to obtain a comparison result comprising a first difference between the HPL and preset HPL threshold, a second difference between the VPL and the preset VPL threshold, and a third difference between the EMT and the preset EMT threshold;

determining the availability of the satellite navigation system at the current time point and at the time point next to the current time point time when the aerial craft is on a long-distance flight in accordance with the comparison result; and applying the satellite navigation system to the aerial craft when an integrity requirement for navigation performance needed in the flight phase of an aerial craft is satisfied in accordance with the comparison result and availability.

2. The evaluation method according to claim 1, wherein the performing empirical mode decomposition on the position coordinate and the clock offset respectively to obtain a position coordinate mode component and a clock offset mode component of each satellite at each time point comprises:

selecting a first one of the position coordinates or a first one of the clock offsets as a parameter to be decomposed, and calculating a mean value of an upper and lower envelope of the parameter to be decomposed;

calculating a difference between the parameter to be decomposed and the mean value of the upper and lower envelope of the parameter to be decomposed, to obtain a first differential component;

calculating a mean value of an upper and lower envelope of the first differential component;

calculating a difference between the first differential component and the mean value of the upper and lower envelope of the first differential component, to obtain a second differential component;

determining whether the second differential component is an intrinsic mode function according to a standard deviation of the first differential component and the second differential component;

if not, taking the second differential component as a parameter to be decomposed, and proceeding back to the step of calculating a mean value of an upper and lower envelope of the parameter to be decomposed; and if yes, recording the second differential component as an intrinsic mode component on a mode component list corresponding to the parameter to be decomposed; calculating a difference between the parameter to be decomposed and the second differential component, to obtain a redundant component; if the redundant component is a monotonic function or an amplitude of the redundant component is less than a preset amplitude threshold, taking a sum of each of the intrinsic mode components on the mode component list and the redundant component as a mode component corresponding to any one of the position coordinates or any one of the clock offsets, and selecting a second position coordinate different from the first one of the position coordinates or a second clock offset different from the first one of the clock offsets as a parameter to be decomposed, until the mode components corresponding to all the position coordinates and the mode components corresponding to all the clock offsets are obtained; or otherwise, taking the redundant component as a parameter to be decomposed, and proceeding back to the step of calculating a mean value of an upper and lower envelope of the parameter to be decomposed.

3. The evaluation method according to claim 2, wherein the determining whether the second differential component is an intrinsic mode function according to a standard deviation of the first differential component and the second differential component comprises:

calculating a difference between the second differential component and the first differential component, to obtain a difference value;

calculating a ratio of a squared absolute value of the difference value to a squared value of the second differential component; and if the ratio of the squared values does not fall outside a preset ratio interval, the second differential component being determined as an intrinsic mode function; or otherwise, the second differential component being determined as a non-intrinsic mode function.

4. The evaluation method according to claim 1, wherein the obtaining a position coordinate mode component and a clock offset mode component of each satellite at a time point next to the current time point respectively, according to a preset autoregressive moving average model, a preset random noise sequence parameter, and the position coordinate mode component and the clock offset mode component of each satellite at each time point comprises:

selecting a first one of the satellites as a target satellite;

calculating a product of each position coordinate mode component of the target satellite at each time point with preset time series respectively, summing the products and obtaining a sum of first products; and taking a sum of the sum of the first products and the random noise sequence parameter as the position coordinate mode component of the target satellite at the time point next to the current time point;

calculating a product of each clock offset mode component of the target satellite at each time point with the preset time series respectively, summing the products and obtaining a sum of second products; and taking a sum of the sum of the second products and the random noise sequence parameter as the clock offset mode component of the target satellite at the time point next to the current time point; and selecting a first satellite different from the first one of the satellite as the target satellite, until the position coordinate mode components and the clock offset mode components of all the satellites at the time point next to the current time point are obtained.

5. A device for determining the availability of a satellite navigation system, comprising:

a satellite receiver to receive measurement data of each satellite at each time point for the aerial craft, the measurement data including a position coordinate and a clock offset of the satellite, and the each time point including a current time point and several time points before the current time point; and a processor, configured to:

perform empirical mode decomposition on the position coordinate and the clock offset respectively, to obtain a position coordinate mode component and a clock offset mode component of each satellite at each time point;

obtain a position coordinate mode component and a clock offset mode component of each satellite at a time point next to the current time point respectively, according to a preset autoregressive moving average model, a preset random noise sequence parameter, and the position coordinate mode component and the clock offset mode component of each satellite at each time point;

calculate a horizontal protection level (HPL), a vertical protection level (VPL) and an effective monitor threshold (EMT) respectively, according to the position coordinate mode component and the clock offset mode component of each satellite at the time point next to the current time point and preset ground integrity support information; and compare the HPL, the VPL and the EMT respectively with a preset HPL threshold, a preset VPL threshold, and a preset EMT threshold, to obtain a comparison result comprising a first difference between the HPL and preset HPL threshold, a second difference between the VPL and the preset VPL threshold, and a third difference between the EMT and the preset EMT threshold;

determine the availability of the satellite navigation system at the current time point and at the time point next to the current time point time when the aerial craft is on a long-distance flight in accordance with the comparison result; and apply the satellite navigation system to the aerial craft when an integrity requirement for navigation performance needed in the flight phase of an aerial craft is satisfied in accordance with the comparison result and availability.

6. The device according to claim 5, wherein the processor is configured to:

select a first one of the position coordinates or a first one of the clock offsets as a parameter to be decomposed, and calculate a mean value of an upper and lower envelope of the parameter to be decomposed;

calculate a difference between the parameter to be decomposed and the mean value of the upper and lower envelope of the parameter to be decomposed, to obtain a first differential component;

calculate a mean value of an upper and lower envelope of the first differential component;

calculate a difference between the first differential component and the mean value of the upper and lower envelope of the first differential component, to obtain a second differential component;

determine whether the second differential component is an intrinsic mode function according to a standard deviation of the first differential component and the second differential component;

if not, take the second differential component as a parameter to be decomposed, and proceed back to the step of calculate a mean value of an upper and lower envelope of the parameter to be decomposed; and if yes, record the second differential component as an intrinsic mode component on a mode component list corresponding to the parameter to be decomposed; calculate a difference between the parameter to be decomposed and the second differential component, to obtain a redundant component; if the redundant component is a monotonic function or an amplitude of the redundant component is less than a preset amplitude threshold, take a sum of each of the intrinsic mode components on the mode component list and the redundant component as a mode component corresponding to any one of the position coordinates or any one of the clock offsets, and select a second position coordinate different from the first one of the position coordinates or a second clock offset different from the first one of the clock offsets as a parameter to be decomposed, until the mode components corresponding to all the position coordinates and the mode components corresponding to all the clock offsets are obtained; or otherwise, take the redundant component as a parameter to be decomposed, and proceed back to the step of calculating a mean value of an upper and lower envelope of the parameter to be decomposed.

7. The device according to claim 6, wherein the processor is configured to:

calculate a difference between the second differential component and the first differential component, to obtain a difference value;

calculate a ratio of a squared absolute value of the difference value to a squared value of the second differential component; and if the ratio of the squared values does not fall outside a preset ratio interval, determine the second differential component as an intrinsic mode function; or otherwise, determine the second differential component as a non-intrinsic mode function.

8. The device according to claim 5, wherein the processor is configured to:

select a first one of the satellites as a target satellite;

calculate a product of each position coordinate mode component of the target satellite at each time point with preset time series respectively, sum the products and obtain a sum of first products; and take a sum of the sum of the first products and the random noise sequence parameter as the position coordinate mode component of the target satellite at the time point next to the current time point;

calculate a product of each clock offset mode component of the target satellite at each time point with the preset time series respectively, sum the products and obtain a sum of second products; and take a sum of the sum of the second products and the random noise sequence parameter as the clock offset mode component of the target satellite at the time point next to the current time point; and select a second one of the satellites different from the first one of the satellites as the target satellite, until the position coordinate mode components and the clock offset mode components of all the satellites at the time point next to the current time point are obtained.

* * * * *